United States Patent [19]

Peters

[11] 4,265,077
[45] May 5, 1981

[54] BLOWER SYSTEM FOR AN AXIAL FLOW ROTARY COMBINE CLEANING SHOE

[75] Inventor: Loren W. Peters, Bettendorf, Iowa

[73] Assignee: Deere & Company, Moline, Ill.

[21] Appl. No.: 63,423

[22] Filed: Aug. 3, 1979

[51] Int. Cl.³ .................... A01F 12/20; A01D 14/02
[52] U.S. Cl. .................... 56/14.6; 130/27 T; 130/27 HF
[58] Field of Search ............ 56/14.6; 130/27 R, 27 T, 130/24, 26, 27 HF; 209/22–27, 134–137, 312, 321

[56] References Cited

U.S. PATENT DOCUMENTS

| | | | |
|---|---|---|---|
| 2,284,433 | 5/1942 | Korsmo et al. | 130/27 R |
| 2,820,989 | 1/1958 | Bopf | 209/137 |
| 3,049,128 | 8/1962 | Mark et al. | 130/26 |
| 3,800,804 | 4/1974 | Boone | 130/27 HF |
| 4,003,384 | 1/1977 | Komancheck et al. | 130/27 T |
| 4,078,571 | 3/1978 | Todd et al. | 56/14.6 |
| 4,108,150 | 8/1978 | Shaver | 56/14.6 |

*Primary Examiner*—Robert A. Hafer

[57] ABSTRACT

A self-propelled axial flow rotary combine includes a generally fore-and-aft disposed separator including a separating rotor surrounded by a cylindrical grate. A forward-mounted header gathers crop material from a field and feeds it to the space between the rotor and the grate for threshing and separation, straw being ejected from the rear of the separator and a portion of the crop material, including grain and chaff, passing through the grate and generally downwards to be intercepted by either a reciprocating grain pan under a forward portion of the separator or a reciprocating cleaning shoe immediately rearward of the grain pan and beneath a rearward portion of the separator. The grain pan is shaped so as to compensate for the laterally uneven distribution of the crop material as it passes downwards from the grate so that delivery of material from the rearward edge of the grain pan to the cleaner is distributed more uniformly across the width of the cleaner. Beneath the grain pan and forward of the cleaner is a blower assembly including four individually housed centrifugal blower wheels, each scrolled housing permitting axial flow of air into each wheel from both sides and centrifugal delivery over substantially the entire periphery of each wheel. The fan housings and ducts are arranged so that a portion of the air delivered by each blower wheel is delivered almost directly rearwardly and upwardly to the cleaning shoe while the remaining air portion is directed horizontally forward into a duct system extending across the width of the separator body and provided with deflectors for reversing the air flow so that it passes rearwardly above the grain pan and beneath and alongside the separator grate. The larger radius and greater depth of opposite reversing outer air flow deflectors compared with a center deflector results in an air flow pattern with respect to the grate having an inner shallower portion and outer portions of greater vertical extent.

30 Claims, 8 Drawing Figures

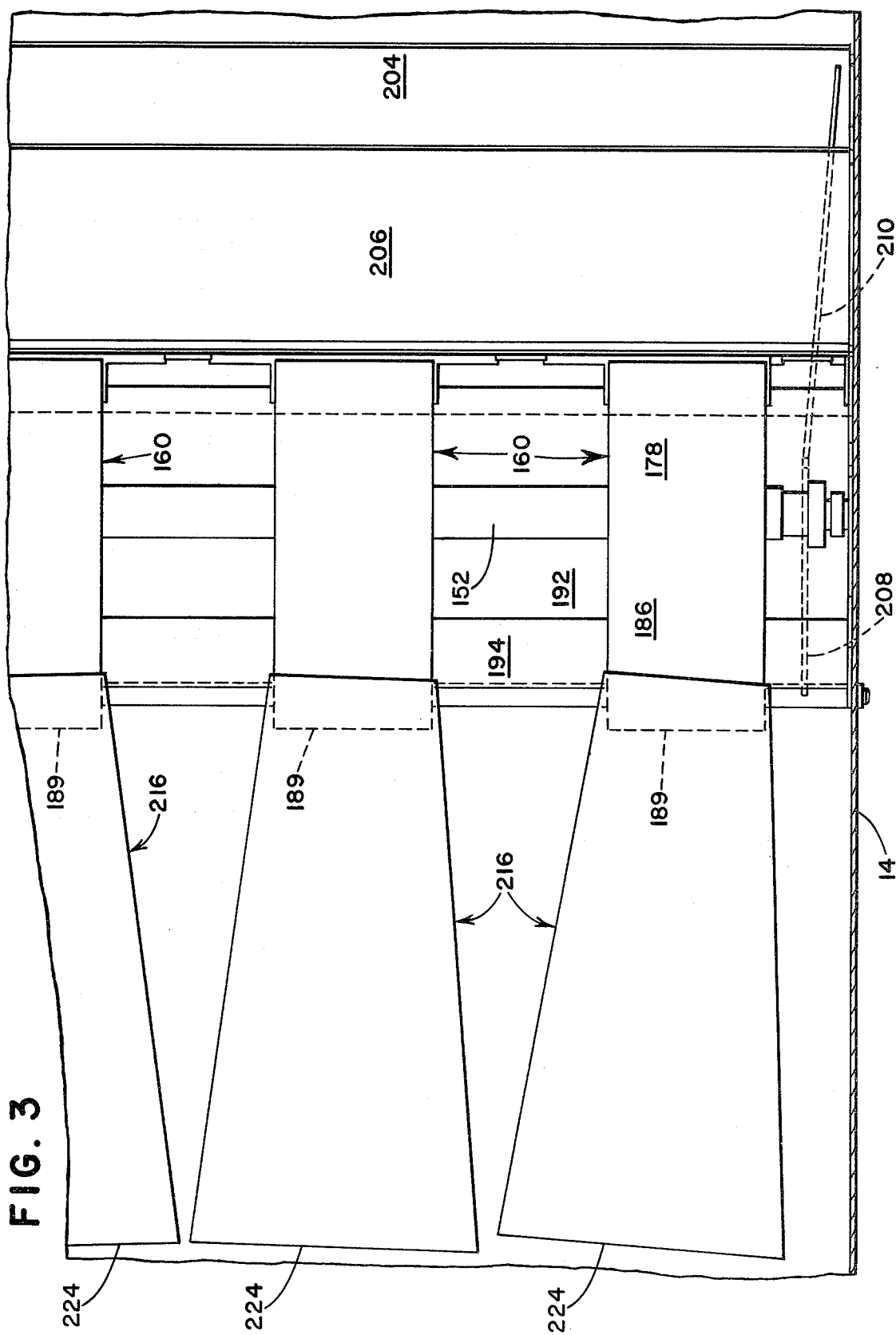

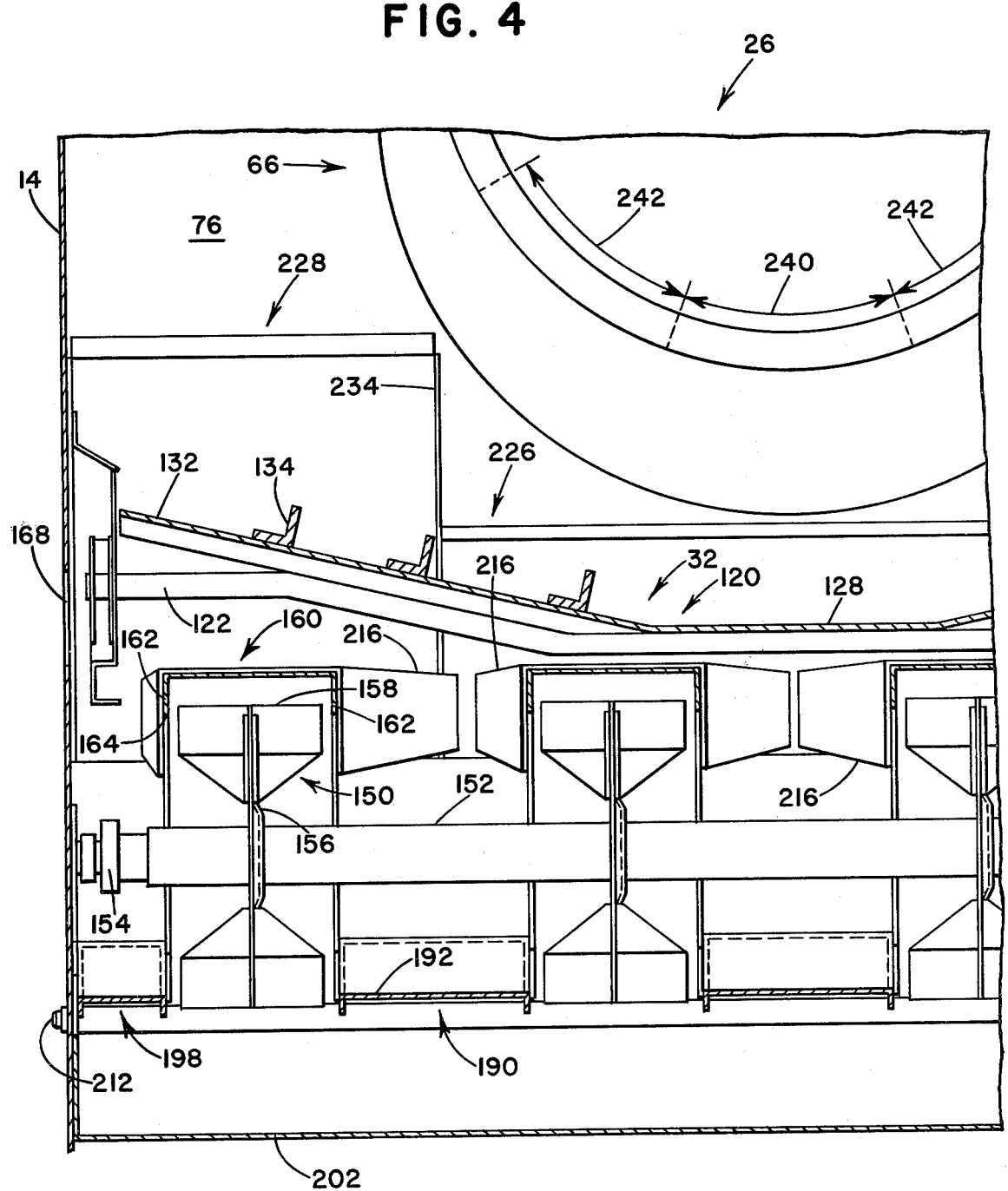

BLOWER SYSTEM FOR AN AXIAL FLOW ROTARY COMBINE CLEANING SHOE

BACKGROUND OF THE INVENTION

The invention relates generally to axial flow rotary separators for agricultural crops such as grain of the type which may be included in a self-propelled combine harvester and more particularly to aerodynamic means which may be combined with mechanical means for conditioning at least a portion of the crop material passing from the separator to a cleaning shoe so as to increase overall separating efficiency and enhance the efficiency of the cleaning shoe.

It is known to divert part of the air delivered by a blower (whose main function is to provide an air blast for conventional reciprocating shoe) to engage a flow of crop material before it reaches the shoe to effect additional separation or preliminary cleaning. However, such known blower arrangements are associated with combines using a conventional transversely disposed threshing cylinder and grate with conventional straw walkers for separation, and which thus have the characteristic of maintaining uniform distribution of material across the width of the combine, or at least of not concentrating such flow with respect to lateral distribution. Such arrangements typically take the delivery of air from a restricted portion of the periphery of a centrifugal fan and subsequently split the air flow or in some cases two separate blowers are used.

U.S. Pat. No. 3,800,804, Boone, discloses a transverse flow fan, the output of which is split between a conventional cleaning shoe and a stream of crop material in which is combined the deliveries from a grain pan and straw walkers, with the object of effecting a pre-cleaning of that stream of material before it reaches a cleaning shoe. However, a disadvantage of this arrangement is that the crop material is already relatively concentrated so that an air blast has relatively less separating effect on it. It is also inherent in a transverse flow fan that part of the periphery must be reserved for an air inlet so that such fans are somewhat less flexible in applications where widely diverging air flow deliveries are required.

U.S. Pat. No. 3,603,063, Stroburg, discloses an attempt to take a part of the air flow from a cleaning shoe fan to provide an air flow between a threshing concave and a grain conveyor or grain pan beneath the concave so as to float some chaff and straw rearwards out of the machine and thus reduce cleaning shoe loading. However Stroburg discloses no means for concentrating the air flow in this area in a rearwardly directed stream.

It is also known in a self-propelled combine having a transversely disposed axial flow threshing and separating rotor above a conventional cleaning shoe, to divide the delivery from a transversely disposed transverse flow fan between the cleaning shoe itself and a flow of crop material from the separator which has been concentrated by suitable conveying and material handling means before being accelerated downwards.

However, the known prior art does not offer a blower arrangement particularly adapted to a combine having a fore and aft disposed axial flow separator operatively associated with a conventional cleaning shoe and designed to enhance the cleaning efficiency of the combination and help realize the relatively high volumetric efficiency potential in a combine having an axial flow rotary separator.

SUMMARY OF THE INVENTION

Accordingly it is an object of the present invention to provide a system of cleaning air and conveying means for crop material moving between an axial flow rotary separator and a conventional cleaning shoe disposed beneath it that is adapted to the characteristics of such a combination including the tendency for the delivery from a rotary separator grate to be unevenly distributed laterally.

It is a feature of an air system according to the invention to direct a stream or blast of air rearwardly adjacent the outer surfaces of a rotary separator housing or grate so as to impinge directly on the longitudinally and laterally dispersed flow of material from the separator grate so as to pre-clean and condition it preparatory to its reception by the cleaning shoe and so to enhance the efficiency of the cleaning shoe. It is a feature of the invention that the air flow along the separator grate is differentiated laterally to take account of the tendency of the laterally outward portions of the material flow from the grate to be more concentrated and to provide an air flow stream which is laterally differentiated, for example, by being of greater vertical extent in the outer portions of the air stream than in the center directly under the separator grate. The outer portions of the airstream may also be of higher velocity.

Another feature of the invention is to provide a grain conveyor, for receiving crop material directly from the separator grate and delivering it to the cleaning shoe, of such a configuration that during its passage over the conveyor crop material tends to be redistributed from a mat tending to be more concentrated in its laterally outward portions to a more laterally uniform mat at the conveyor discharge end above the cleaning shoe. Such a conveyor may be a grain pan of shallow trough-like form with a floor portion narrowing towards a downstream or discharge end and having gently sloping sides.

Another feature of the invention is to provide a blower assembly including a transversely disposed plurality of blower wheels each with its own housing and housing air inlets, delivering air centrifugally over substantially 360° of the wheel periphery, a portion of the air being ducted generally rearwardly and upwardly to provide the aerodynamic component of a conventional cleaning shoe where cleaning is effected through a combination of mechanical and aerodynamic separation. Another portion of the air discharge may be taken and ducted and/or deflected so as to create a rearwardly directed stream of air above a grain pan receiving crop material from the separator and beneath and alongside the outer surfaces of the grate of such a separator. It is a feature of the invention to provide ducts and deflectors which result in differentiation across the width of the separator in terms of air velocity and/or depth of the air stream. Such differentiation is advantageous with axial flow rotary separation in general and particularly when the separator housing or grate is provided with openings so that separation takes place over 360° of its periphery resulting in a concentration of crop material in the laterally outward portions of the flow of crop material falling towards a grain conveyor and cleaning shoe, compared with a central portion.

The blower wheels of the blower assembly are preferably laterally spaced to provide for free flow of inlet air axially into them and there may be provided, between each housing, an arcuate floor concentric and approximately coextensive with the periphery of opposite housing air inlet openings so as to provide a first portion of the inner wall of a duct directing air to the cleaning shoe. Such intermediate floor portions facilitate the transition from individual blower wheel housings to a single duct spanning the full width of the cleaning shoe in which air directed rearwards and upwards toward the cleaning shoe is diffused, very soon after discharge from the respective blower wheels, into substantially a single stream having, as is desirable, approximately uniform velocity across its width while minimizing the overall length of the blower assembly.

It is in keeping with the invention that the blower wheels may be of small diameter, adaptable to a space-saving compact arrangement in which a blower wheel array may be disposed somewhat rearward of the front of the separator grate and connected to a cleaning shoe by a rearwardly and upwardly directed duct. Ducts for conveying air to the outside of the separator grate may then be carried forward under a grain pan and the flow of air reversed and carried up and over the grain pan and between the separator grate by means of suitable deflectors or scoops. The compact blower wheel array may conveniently be placed between a front axle and the cleaning shoe of the combine without extending the combine wheelbase.

A particular advantage of the invention that it may provide a rearwardly directed stream of air alongside the outer surfaces of the grate of an axial flow rotary separator to engage the flow of crop material while it is still dispersed and more susceptible to an efficient aerodynamic pre-cleaning than when in a concentrated, denser flow of material, as presented, for example, in the discharge from a conveyor. In addition, especially if the air stream has an upward component, the helpful preconditioning effects include "stratification" of material falling onto a grain pan or the chaffer of a cleaning shoe, whereby the heavier components of the crop material, including grain, reaches the surfaces of these members first.

BRIEF DESCRIPTION OF THE DRAWINGS

FIG. 3 is an enlarged partial overhead view approximately on line 3—3 of FIG. 2 showing the blower housing and duct assemblies.

FIG. 4 is an enlarged partial cross-sectional view approximately on line 4—4 of FIG. 2 showing the blower wheel and housing assemblies and the general vertical and lateral relationships between the separator housing, grain pan and air deflectors for providing air flow rearwards over the grain pan.

DESCRIPTION OF THE PREFERRED EMBODIMENT

Figure 1:
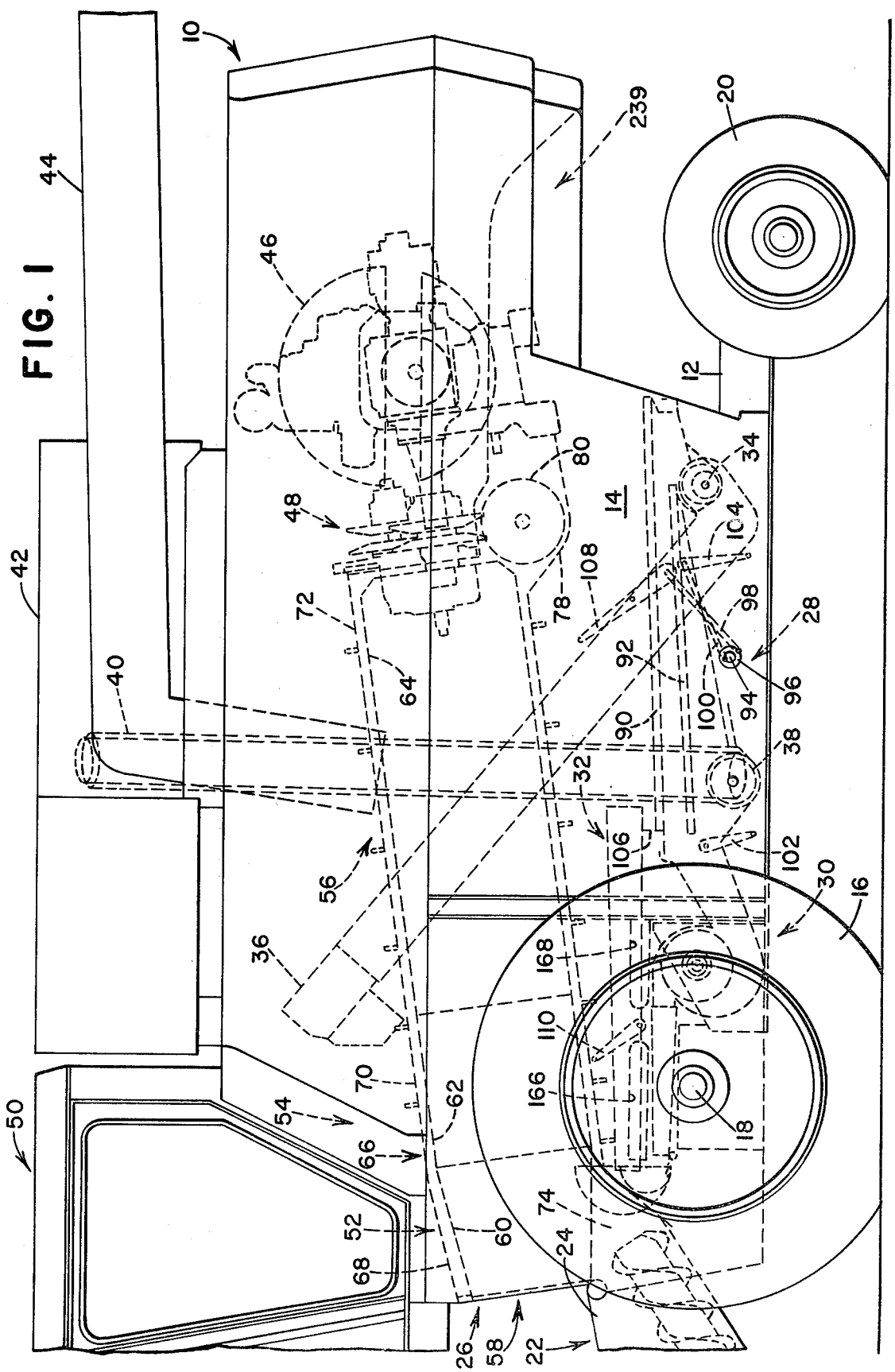
FIG. 1 is a somewhat schematic overall left side view of a combine embodying the invention omitting forward portions of the header and unloading conveyor.

The invention is embodied in a self-propelled combine shown in FIG. 1 in semi-schematic side view with portions of the forward and rearward extremities of the combine omitted. The combine includes a body indicated generally by the numeral 10 including an interconnected supporting structure or frame, not shown in detail but exemplified by the frame member 12, and opposite generally upright fore-and-aft extending body or separator side walls 14.

The combine is supported above the ground on a pair of forward drive wheels 16 carried on a front axle 18, and a pair of steerable rear wheels 20. A header assembly 22, of which only a portion of the feeder house 24 is shown, is pivotally carried at the front of the machine for gathering a crop from a field and feeding it by way of the feeder house 24 to a generally fore-and-aft extending axial flow rotary separator 26. A fore-and-aft extending generally conventional cleaning shoe 28 is disposed below and somewhat rearward of the separator 26. Also below the separator 26 and ahead of the cleaning shoe is a blower assembly 30 for providing cleaning air and, above the blower assembly 30 and immediately below the rotary separator 26, a grain pan assembly 32. The general form of self-propelled combines with axial flow rotary separators is well known and only brief description is given here. Additional description is given in co-pending U.S. patent applications Ser. Nos. 885,305 and 889,626 also assigned to the assignee of the present invention.

The function of the cleaning shoe 28 is generally conventional and divides material received from the rotary separator 26 into a tailings portion which is conveyed by a tailings cross conveyor 34 to a tailings auger 36 and thus returned to the rotary separator 26 for re-processing; a clean-grain portion which is taken by a clean-grain cross conveyor 38 to a clean-grain upright auger 40 for delivery to a grain-holding tank 42; and a chaff portion which falls to the ground from the rear of the cleaning shoe 28. Clean grain may be unloaded from the tank 42 by means of a swingable unloading conveyor assembly 44.

A rear-mounted engine 46 provides power for propulsion of the combine and driving its functional components by generally conventional drive systems which are not shown except for a main transmission assembly directly driven by the engine 46 and indicated generally by the numeral 48. An operator's station 50 is provided ahead of the grain tank 42 and above the rotary separator 26.

The rotary separator 26 is generally conventional and is shown only in schematic outline in FIG. 1. It is mounted approximately centrally between the opposite side walls 14 and includes a forward infeed portion 52, a threshing portion 54 and a rearmost separating portion 56. A rotor 58, rotatably mounted and extending the full length of the separator, includes infeed, threshing and separating portions 60, 62 and 64 respectively and is surrounded by a separator housing 66 including infeed, threshing and separating portions, 68, 70 and 72 respectively. The infeed housing 68 is connected with the feeder house 24 by an opening 74 so that crop material may enter and be received by the infeed portion 60 of the rotor 58. The external surfaces of the rotor 58 and the internal surfaces of the housing 66 include raised elements (not shown) such as helical members for conveying or displacing axially crop material in the space between the rotor 58 and housing 66, and blades or bars in the threshing and separating portions 62 and 64 respectively of the rotor 58 for cooperating with the fixed housing 66 to thresh and separate crop material as it is conveyed through the separator. Portions of the threshing and separating parts 70 and 72 respectively of the housing 66 are foraminous taking the form of grates or screens so that crop material can pass through the housing 66 into spaces such as those indicated by the numeral 76 in FIG. 4 between the housing 66 and the opposite side walls 14 of the separator body 10.

The open rearward extremity of the separator housing or grate 64 is connected on its lower side with a transverse beater housing 78 and a transverse beater 80 is mounted closely adjacent and somewhat below the rearward extremity of the separating portion 64 of the rotor 58.

The cleaning shoe 28 includes an upper screen element or chaffer 90 and below it a somewhat shorter screen element or sieve 92. Oscillation or reciprocation of the chaffer 90 and sieve 92 derive from a transversely mounted driven shaft 94 supported in bearings in the combine frame and carrying at one of its ends, adjacent a body side wall 14, a flange 96 for providing an eccentric drive for oscillation of the cleaning shoe 28 through a chaffer pitman 98 and a sieve pitman 100, each pivotally connected to the drive flange 96 at approximately diametrically opposite points. The sieve 92 is supported for generally fore-and-aft oscillation by pairs of opposite forward and rear hangers 102 and 104 respectively, pivotally connected between the combine frame and the sieve 92. The sieve pitman 100 and sieve left-hand rear hanger 104 are connected to the sieve 92 at the same pivot point.

The chaffer 90 and the grain pan assembly 32 are connected rigidly together by a structural link 106 and are supported for oscillation as a single unit by a pair of opposite rearward or chaffer hangers 108 and a pair of opposite forward or grain pan hangers 110. The chaffer pitman 98 is pivotally connected to a downward extension of the left-hand chaffer hanger 108. As is indicated in FIG. 1 and as is conventional, the configuration of the suspension of the chaffer 90 and the sieve 92 respectively and of their pitman drives is such that the oscillating motion of the chaffer 90 (and of the grain pan assembly 32) connected to it has a greater vertical component than that of the sieve 92.

Figure 5:
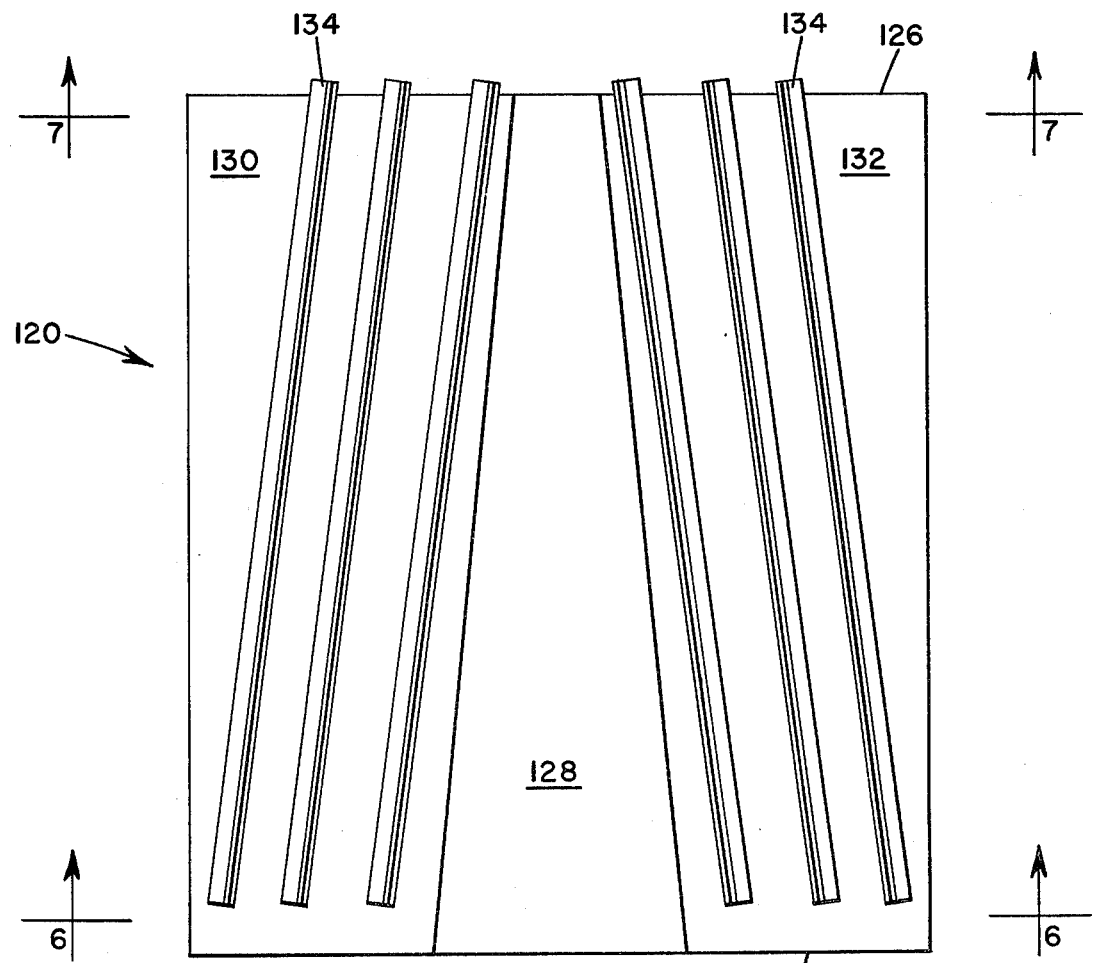
FIG. 5 is an enlarged overhead view of the grain pan assembly.

The grain pan assembly 32 includes a grain-supporting surface or floor 120 carried on a support frame 122 (best seen in FIG. 4) to which the grain pan hangers 110 are pivotally connected (connection shown only schematically in FIG. 1). The grain pan floor has a forward edge 124, a rearward edge 126 and an almost horizontal flat center portion 128 which is wider at the front edge 124 and narrower at the rear edge 126 (FIG. 5). The floor 120 also includes opposite right and left-hand side portions 130, 132 respectively contiguous with and sloping gently outwards and upwards from the central floor portion 128 so that the floor 120 overall is in the form of a shallow trough. On each of the sloping portions 130, 132 are mounted three guide ribs 134, the ribs within each group being approximately parallel and the groups converging towards the rear.

The blower assembly 30 comprises an array of four blower wheel assemblies 150 (see particularly FIGS. 3 and 4), transversely and approximately equally spaced on a shaft 152 which is supported by the combine frame 12 in suitable bearings 154 adjacent the opposite side walls 14 of the combine body 10. The spacing between the opposite side walls 14 and the outermost blower wheel assemblies 150 is approximately equal to half the spacing between adjacent blower wheel assemblies. Each blower wheel assembly 150 consists of a disk 156 rigidly attached to the shaft 152 and carrying a series of paddles 158 approximately radially arranged and extending symmetrically on both sides of the disk 156 so as to constitute the wheel or impeller of a centrifugal blower.

Figure 2:
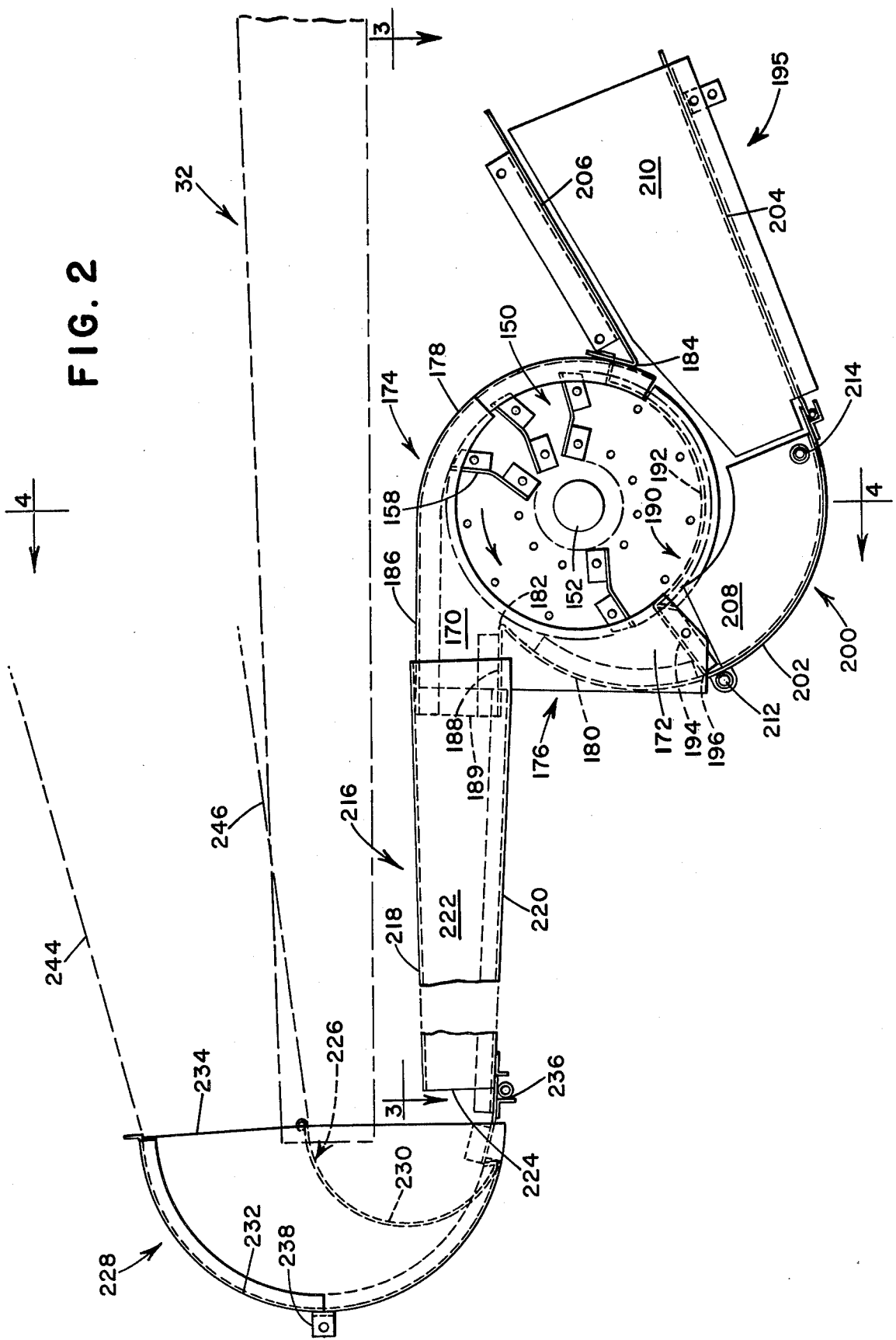
FIG. 2 is an enlarged partial side view of the blower and duct assembly with grain pan location indicated in phantom outline.
Figure 7:
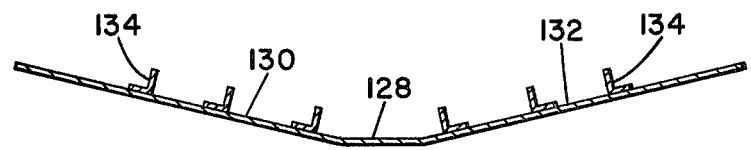
FIG. 7 is a cross-sectional view of a rearward portion of the grain pan assembly on line 7—7 of FIG. 5.
Figure 6:
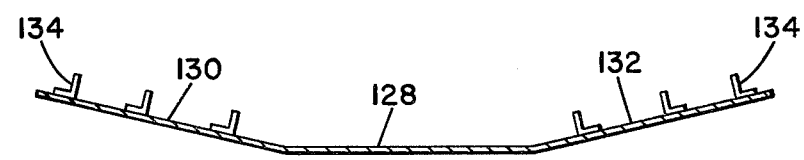
FIG. 6 is a cross-sectional view through a forward portion of the grain pan assembly approximately on line 6—6 of FIG. 5.
Figure 8:
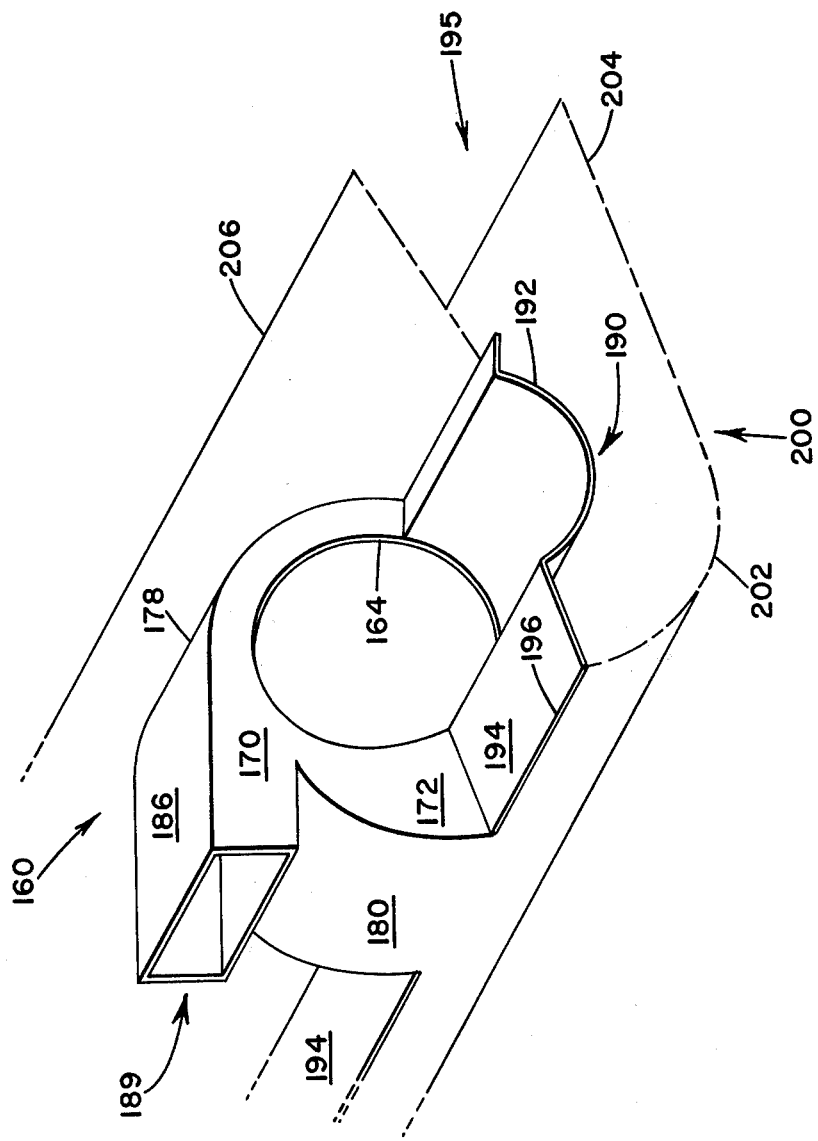
FIG. 8 is a simplified, somewhat schematic, left-hand front three-quarter view of an individual blower housing and associated duct surfaces, partially cut away and particularly illustrating the connection between the blower wheel charges and a full width rearwardly and upwardly directed duct.

A housing assembly 160 is operatively associated with and partially encloses each blower wheel assembly 150 (see particularly FIGS. 2 and 8). Each housing includes opposite generally fore-and-aft extending inlet walls 162 closely spaced from the paddles 158 and each having an inlet eye or opening 164 concentric with the blower shaft 152 and somewhat less in diameter than the outside diameter of the blower wheel assemblies 150. Openings such as these shown at 166 and 168 in the opposite side walls 14 (FIGS. 1 and 4) and generous openings (not shown) in the grain pan support frame 122 facilitate a flow of outside air to the inlet eyes 164 of the blower housings 160. As seen in FIG. 4, the upward slopes of the grain pan side portions 130, 132 provide space for air entering through the side wall openings 166, 168 to pass freely above the outer blower housing assemblies 160 to reach the inlet openings 164 of the inner assemblies. Air may flow to the general area of the blower housing inlets 164 from other openings (not shown) in the combine body 10 but openings in the underside are preferably to be avoided so as to minimize the amount of leaves andd other large trash entering the blower system. If this is done, screened inlets are generally not required. Each inlet wall 162 includes a somewhat tangentially disposed forward extending upper duct wall portion 170 and diverging and extending downwards adjacent the forward side of the inlet eye opening 164, a lower duct wall portion 172.

The outer peripheries of the housing 160 are formed by upper and lower wrapper portions 174 and 176 respectively. Each wrapper portion includes a scroll portion, 178 and 180 respectively, commencing, in terms of blower wheel rotation, at a cut-off point or edge, 182 and 184 respectively, closely adjacent the periphery of the blower wheel 150 and diverging smoothly and progressively from the blower wheel periphery so as to permit centrifugal discharge of air from the paddles 158 of the blower wheel 150 for later delivery to a duct generally tangential to the blower wheel 150. The cut-off edges 182 and 184 are approximately diametrically opposed and, as can be seen in FIG. 2, centrifugal discharge of air from the blower wheel may take place over substantially the entire blower wheel periphery. The upper wrapper 174 includes a flat and approximately horizontal upper duct outer wall 186 forming a tangential extension of the upper scroll portion 178. The lower wrapper 176 also includes an approximately flat duct portion 108 extending forward and constituting, with the outer duct portion 186 and the opposite duct wall portions 170, an outlet duct 189 from the blower housing of approximately rectangular cross section.

Between each housing 160, extends a duct-forming floor 190 including an arcuate portion 192 approximately contiguous and concentric with (at its opposite lateral sides) a lower arc of the inlet eyes or openings 164 of the respective housings 160. From the forward edge of each arcuate portion 192 a duct end portion 194 extends approximately radially outwards to an outer edge 196 aligned with the lower end of the lower wrapper portion 176. Additional floor pieces 198 similar to the duct-forming floors 190 but only about half their width extend between the outer inlet walls 162 of the outermost housings 160 and the opposite side walls 14 of the combine body 10.

As can be seen best in FIGS. 2, 3 and 8, beginning at the level of the cover duct end portion 194, a single duct 195 for rearward and upward delivery of air is formed, in its outer surface, by a lower duct bottom floor 200, extending between the opposite body side walls 14 and including an arcuate portion 202 directly beneath the blower wheel assembly 150 and continuing the diverging curve of the scroll portions 180 of the lower fan housing wrappers 176 and terminating in a flat rearwardly and upwardly sloping portion 204. The depth of this full width rearwardly directed duct 195 is defined by a duct top wall 206 contiguous with the lower cutoff edges 184 and disposed so as to diverge somewhat from the bottom duct portion 204. The opposite ends of this lower duct 195 are defined by two pairs of opposite baffle members 208 and 210 respectively disposed close to the opposite body side walls 14 but diverging slightly towards the rear. Provision of a pivot arrangement 212 and suitable removable retaining hardware 214 facilitate swinging down the arcuate portion 202 of the lower duct 195 for service access to the blower wheel assembly 150.

Various names have been assigned to the several portions of the structure serving as air control and directing surfaces or forming ducts or channels. But it will be realized that the divisions or demarcations so suggested are for convenience in description and partly suggested by the construction used in this particular embodiment. The form and function suggested by the name assigned to a given part may well overlap an adjacent part and the name assignments are not meant to be restrictive. For example, the scroll form of the lower portion of the housing 160 includes what has been called an arcuate portion 202 of the lower duct 195 but which is in form and function also an extension of the surface defined by the scroll portion 180. The duct arcuate portion 202 and the arcuate portions 192 of the duct-forming floors 190 taken together form the beginning of a full width duct 195 having inlets directly communicating with each blower housing 160 and defined by the spaces between the adjacent floor portions 190.

A somewhat funnel-shaped upper duct assembly 216 has a smaller end fitting closely over the upper outlet duct 189 and diverging towards the front of the combine. The duct assembly 216 is made up of top and bottom sheets 218 and 220, respectively, and opposite side sheets 222. As is indicated in FIG. 3, four equal ducts are provided.

Each upper duct assembly 216 has an approximately rectangular outlet opening 224 adjacent an air deflector or scoop assembly, consisting of an inner deflector assembly 226 and a pair of outer deflector assemblies 228. Each deflector assembly 226 and 228 includes a curved wall or floor portion 230 and 232, respectively, and may include a structurally stiffening side wall or air control baffle such as that indicated at 234 in the outer scoop assemblies 228. As is seen best in FIG. 2 the lower portion of each deflector wall or floor 230, 232 is approximately tangential with the bottom sheet 220 of an upper duct assembly 216 and curves upwardly and rearwardly over the forward edge 124 of the grain pan assembly 32 so that air flowing from each upper duct assembly 216 is deflected first upwardly and then rearwardly over the grain pan 32. The lateral span of the inner deflector assembly 226 corresponds approximately to the span of the two inner duct assemblies 216 and that of each of the outer deflector assemblies 228 to an outer duct assembly 216. A pivot assembly and retaining clips such as those indicated at 236 and 238 in FIG. 2 may be provided to permit swinging of the deflector assemblies 226, 228, for service access in the grain pan 32 area.

In operation, as the combine advances in a field of crop material, crop is gathered and fed by the feeder house 24 to the rotary separator 26 where threshing and separation takes place in the annular space between the rotor 58 and the housing 66 while material is conveyed spirally rearward. Straw reaching the rear end of the separator 26 is engaged by the beater 80 and discharged rearward through an opening 239 in the combine body onto the ground. Other material comprising principally grain and chaff passes through openings in the housing 66 partially by centrifugal action and is then free to pass down under the action of gravity on either side of the separator housing 66 and within the opposite side walls 14 in the spaces 76 to be received either by the grain pan assembly 32 or the cleaning shoe 28.

A major part of the grain in the crop material is threshed out in the threshing portion 54 of the separator 26 so that material emerging from the separator housing 66 is "grain rich" at the forward end of the separator but becomes progressively less "grain rich" towards the rear of the separator.

When foramina or openings are provided in the threshing and separating portions 70 and 72, respectively, of the separator housing 66 over the entire periphery (360°) as in the present embodiment so that crop material passes through the housing at an approximately uniform rate around its periphery, it will be apparent that the crop material reaching the grain pan assembly 32 and the cleaning shoe assembly 28 will not be distributed uniformly laterally. Only that portion of the crop material emerging from a lowermost arc 240 (such as that indicated in FIG. 4) can pass directly downwards without significant concentration. Obviously all material from upper portions of the separator housing 66 can reach the receiving surfaces below only by passing downwards in the relatively narrow spaces 76 between the separator housing 66 and the body sidewalls 14, and, in addition, much of the material passing through lower arc portions of the separator housing 66 such as that indicated at 242 in FIG. 4 will be projected laterally outwards due to centrifugal action. Consequently, flow of crop material downwards to the grain pan assembly 32 will be concentrated relatively towards the laterally outwards portions of the grain pan assembly. This type of non-uniform distribution laterally will also occur, although perhaps to a lesser extent, in separator housings not having openings over their entire periphery but only grate portions occupying, for example, a bottom 120° of arc of the housing.

As is conventional, the reciprocating motion of the grain pan assembly 32 is designed to propel rearwardly material falling on it. As material progresses rearwardly over the grain pan surface 120, the combined effects of gravity, the converging and gently inwardly sloping opposite side portions 130 and 132 and the guide ribs 134 is to cause a general migration of crop material towards the central floor portion 128 so that by the time material falls from the rearward edge 126 the laterally non-uniform distribution has been substantially corrected and material is therefore fed more uniformly, with respect to lateral distribution, to the forward end of the chaffer 90. The slope of the grain pan side portion 130,132 and the alignment of the ribs 134 may be chosen to "reverse" the non-uniform distribution of material if desired so that when delivered from the grain pan rear edge 126 material is concentrated relatively towards the center. In this way the grain pan can be matched to the characteristics of the shoe it is feeding. It is noted that material falling directly from the rearward end of the separator housing 66 onto the chaffer 90 receives no correction of lateral distribution but this flow amounts to a relatively small portion of the total loading of the chaffer 90 and its uneven distribution can be tolerated.

The division of the crop material in the cleaning shoe through the reciprocating actions of the chaffer 90 and sieve 92 assisted by the rearwardly and upwardly directed blast of air from the blower assembly 30 is conventional and not described in detail here. Chaff falls to the ground from the rear of the shoe and as mentioned above, clean grain and tailings are conveyed away by the elevators 40 and 36, respectively.

Air for the blower assembly 30 may enter the interior of the separator body 10 through openings in the body such as those indicated at 166 and 168 in FIG. 1. Air for each individual blower wheel assembly 150 may enter the wheel axially from both sides through the opposite inlet eye openings 164 and be discharged centrifugally and from the paddles 158 then tangentially into the housing portions defined peripherally by scroll portions 178 and 180, respectively, before entering the upper duct portions 189 and 216 and lower duct 195. Intially the discharge of air for the rearward or lower duct 195 is confined between the opposite lower duct side wall portions 172. However, as described above and indicated in FIGS. 3 and 8, beyond the duct end portions 194 the air flow of the individual blower wheels 150 emerges into a duct 195 extending the full width of the separator and the individual air streams may expand laterally and blend or merge. Note that a particular configuration of a blower assembly according to the present invention may be such that this merging of the side-by-side air streams from the individual blower wheel assemblies commences well forward in the blower assembly so that even with the relatively short connecting lower portion 195 of the present embodiment, sufficient travel or flow distance is provided so that the adjacent air streams may merge and impinge on the cleaner shoe chaffer 90 and sieve 92 surfaces with a velocity approximately uniformly distributed across the width of the cleaning shoe 28. Efficient and smooth air flow delivery to the shoe is enhanced by the configuration providing a generous depth of duct (equal to at least half the radius of the blower wheel assembly 150) immediately below the blower wheel assembly 150.

As is conventional in the drives of blowers for cleaning shoes, provision is made (but not shown) for varying the rotational speed of the blower wheel assemblies 150 to suit the crop being harvested. Provision may also be made for circumferential adjustment of the cut-off edges 182, 184 by means of bolted and slotted details in the housing assembly, so as to vary the proportion of total blower output going to the respective upper and lower ducts, 216 and 195 respectively. A typical and successful distribution has been of about two-thirds of the total air to the cleaning shoe 28 and one-third over the grain pan assembly 32.

Use of a centrifugal blower wheel of relatively small diameter (and relatively high r.p.m.) is made feasible by the provision multiple air inlets 164 serving a plurality of wheels across the width of the separator body. Typically, in an arrangement using a single full width centrifugal blower with air inlets only at each opposite end, delivered air velocity tends to be unacceptably concentrated in the center of the shoe. Also, unless fan housing inlet area is greater than outlet area, fan volume will be starved or throttled. It is easy to provide needed inlet area with the "segmented" blower arrangement of the present embodiment. Small blower wheel diameter coupled with the cut-off configurations and the particular duct arrangements of the present invention have a potential for overall blower assembly compactness both in depth and length which gives the combine designer more freedom, for example, to optimize grain pan slope without sacrificing overall vehicle height and providing a desired high capacity cleaner blower assembly between front axle 18 and cleaning shoe 28 without "stretching" vehicle length.

The air deflector assemblies 226 and 228 span the space between the opposite separator body walls 14 as indicated in FIG. 4. As seen here and in FIG. 2, the outer deflectors 228 are of greater vertical extent than the inner deflector 226 so that the streams of air flow emerging from the outlets 224 of the upper duct assemblies 216, to be deflected upwardly and rearwardly, are treated in differential fashion, the form of the outer ducts 228 resulting in a rearwardly directed air stream of greater vertical extent than that from the inner deflector assembly 226. A nominal diverging boundary of the respective air streams is indicated schematically in FIG. 2 by the numerals 244 and 246 for the outer and inner air streams respectively. Whether provided by the form and height of a deflector itself or by the diverging nature of an air stream from such a deflector, the outer air stream may pass substantially alongside and generally parallel to the separator housing 66, as indicated in FIGS. 2 and 4, (where the housing is shown in schematic outline only).

In the present embodiment four equal upper duct assemblies 216 are provided but it will be clear that it may sometimes be convenient and appropriate to have a greater or lesser number of blower wheel assemblies 150 and hence of duct assemblies 216 and, further, that the duct assemblies themselves may differ in dimension. For example, even though blower wheels may be of equal dimension and equally spaced and delivering equal quantities of air, the shape and cross-sectional area of their outlets (such as outlet 224) may be chosen so as to vary the shape and mean velocity of the air stream to be received and re-directed by deflectors such as the deflectors 226 and 228. Such alternatives as these provide a variety of means of achieving appropriate lateral differentiation in air flow or air blast rearwardly adjacent and/or alongside and beneath the exterior of the housing of an axial flow rotary separator and/or above a grain pan disposed beneath such a separator. Such air flows may engage the material coming from the separator housing while it is still in its most dispersed state thus offering the greatest potential for effective pre-cleaning (particularly chaff removal) of the material so as to condition it for reception by the cleaning shoe and so as to reduce cleaning shoe loading and increase cleaning shoe efficiency. Such an air flow arrangement is particularly advantageous in the harvesting of small grain where chaff percentage tends to be relatively heavy.

The results in enhanced separater efficiency provided by an air system according to the present invention may, of course, be achieved in combination with grain pan types other than that disclosed here, such as, for example, a grain pan arrangement employing a plurality of auger conveyors or other powered conveyor above a fixed floor.

We claim:

1. In a mobile grain harvester for harvesting and processing crop material, including a generally fore-and-aft extending separator body, containing between opposite fore-and-aft extending housing side walls an axial flow rotary generally mechanically activated, separator having an at least partially foraminous casing and a cleaner below the separator, wherein there is a generally downward flow of at least a portion of the crop material from the foramina of the casing to the cleaner, said flow being dispersed initially over substantially the length of the separator casing, a blower assembly operatively associated with and augmenting the function of the cleaner comprising:

a transversely arrayed plurality of spaced coaxial centrifugal blower wheels;

a plurality of blower housings, each housing partially enclosing one of said blower wheels, for admitting inlet air generally axially to the blower wheels and controlling delivery of air from the wheel, each housing including opposite fore-and-aft extending side walls, each wall having an inlet air opening, and first and second scroll portions, each scroll portion partially wrapping a blower wheel and having a cut-off edge closely adjacent the wheel periphery and a scroll wall progressively diverging, with respect to the direction of rotation of the blower wheel, from the cut-off edge and from the wheel periphery so as to permit and receive generally tangential air delivery from the blower wheel and extending to meet the opposite blower housing side walls, the cut-off edge of the second scroll portion being spaced circumferentially from that of the first; and first and second duct means defining at least partially first and second ducts each having opposite walls including an outer wall approximately tangential to and extending and contiguous with the first and second scroll walls respectively and an inner duct wall extending from said second and first scroll cut-off edges respectively, said ducts receiving and directing the air discharged into the first and second scroll portions, the first duct means being disposed to deliver air rearwardly for engaging at least a portion of the dispersed flow of crop material emerging from the foramina of the separator casing and the second duct means being disposed to deliver air for engaging at least a portion of the crop material received by the cleaner.

2. The invention defined in claim 1 wherein the cut-off edges of each blower housing are approximately diametrically opposed and air is discharged by each blower wheel over substantially the entire periphery of the blower wheel.

3. The invention defined in claim 2 wherein the cut-off edge of each first scroll portion is below and to the rear of the axis of the blower wheels.

4. The invention defined in claim 1 wherein the volume of air delivered through each second duct is greater than that delivered through each first duct.

5. The invention defined in claim 1 wherein each first duct means includes means for controlling the delivery of air so that with respect to the blower wheel, air flows first forward and then rearward to engage crop material passing downward between the separator casing and cleaner.

6. The invention defined in claim 5 wherein the means for controlling air delivery includes duct deflector portions for directing air rearwardly to engage the dispersed crop material passing downward from the separator casing.

7. The invention defined in claim 6 wherein the deflector portions include a center portion and opposite outer portions of greater vertical extent than the center portion.

8. The invention defined in claim 1 wherein the second duct means controls air delivery so that air flow is generally rearwards and upwards.

9. The invention defined in claim 8 wherein the periphery of each inlet opening includes an arcuate portion and further including an arcuate floor extending between adjacent blower wheel housing side walls, each floor being approximately aligned with the arcuate portion of the periphery of the inlet openings and defining an extension of the inner wall of the second duct means.

10. The invention defined in claim 8 wherein each blower housing side wall adjacent each second scroll wall is circumferentially coterminous with that scroll wall and the outer duct wall portions of the second duct means are coextensive extending between the opposite side walls of the separator housing so that air delivered into each second duct means may spread so that air delivery to the cleaner is substantially a single broad stream.

11. The invention defined in claim 10 wherein the radial thickness of the duct defined by the second duct means measured immediately below the blower wheels is at least half the radius of the blower wheels.

12. The invention defined in claim 8 wherein the cut-off edge of each second scroll portion and each second scroll wall is substantially forward of the respective blower wheel.

13. The invention defined in claim 1 wherein the inlet openings are circular and further including a plurality of arcuate duct-forming floors each having a leading and a trailing edge and each concentric with and aligned with the periphery of the inlet openings and extending between adjacent blower housing side walls and spaced radially from but circumferentially adjacent the respective second scroll walls.

14. The invention defined in claim 13 wherein the respective inner and outer walls of the second duct means are contiguous and coextensive and span the array of blower wheels and cooperate with the arcuate duct-forming floors to at least partially define a single duct for receiving and directing tangential air delivery from the second scroll portions.

15. In an axial flow rotary combine having means for gathering a crop from a field, and a separator body housing a separator between opposite fore-and-aft body walls the separator including a fore-and-aft extending rotor surrounded by a separator housing and having an infeed portion, and a feeder house for transferring grain from the gathering means to the rotor infeed portion for processing in the separator, at least a portion of the crop material passing downwards from the separator housing, a grain cleaning system comprising:
- a cleaning shoe dispersed below the separator housing and including at least one oscillating sieve;
- a reciprocable generally fore-and-aft and horizontally extending grain pan below the separator housing, having an upper surface for intercepting at least a portion of the crop material passing downwards from the separator and conveying said material rearwardly, to be discharged from the grain pan and delivered to the cleaning shoe;
- a blower assembly substantially below the grain pan and forward of the cleaning shoe and including a blower wheel having a housing substantially surrounding the blower wheel and including an inlet for axial flow of air into the blower wheel and first and second circumferentially spaced outlets;
- a first duct communicating with the first outlet for controlling the flow of air delivered by the blower wheel through said outlet so that air flow is differentiated between a central portion of lower vertical extend, passing rearwardly over the grain pan and beneath the separator housing and opposite flanking portions of air flow of greater vertical extent passing rearwardly over the grain pan and at least partially alongside the separator rotor; and
- a second duct in communication with the second outlet for controlling air delivered by the blower through said outlet and directing it generally rearwardly and upwardly through the cleaning shoe.

16. The invention defined in claim 15 wherein the upper surface of the grain pan forms a shallow trough having a central floor portion reducing in width from front to rear and opposite sloping laterally outer portions each outer portion contiguous with an opposite edge of the floor portion, the shape of the pan tending to converge material towards its center as material is conveyed rearwardly over the pan.

17. The invention defined in claim 16 wherein each sloping outer portion of the grain pan includes an elongated guide rib, the opposite guide ribs converging towards the rear so as to assist in converging the crop material as it is conveyed rearwards over the grain pan.

18. The invention defined in claim 15 wherein the central and flanking portions respectively of the air flow of the first duct approximately span the total lateral extent of the grain pan at its forward end.

19. In an axial flow rotary combine having a separator body including spaced generally fore-and-aft extending body side walls and a rear outlet and a generally fore-and-aft extending rotor between the side walls and an at least partially foraminous housing surrounding the rotor, a cleaning shoe below the housing, means for gathering crop material from a field and feeding it to the rotor, the rotor and housing cooperating to process the material, a portion of the material passing through the foraminous portion of the housing and being dispersed generally outwards and downwards towards the cleaning shoe, means for intercepting some of the crop material from the housing and for preconditioning it and for delivering it to the cleaning shoe comprising:
- a grain pan extending fore-and-aft below the housing and above the cleaner and substantially spanning the space between the opposite body side walls and having a forward edge and a rearward edge and a floor portion converging in width from front to rear and opposite side wall portions respectively contiguous with opposite sides of the floor portion and sloping outwards and upwards towards the separator body side walls;
- means for oscillating the grain pan so that crop material intercepted by it is conveyed rearwardly and at the same time guided by the sloping sides so that at least a portion of the material migrates towards the center of the grain pan before reaching the rear edge and falling towards the cleaner; and
- a blower assembly for delivering air to intercept at least a portion of the crop material from the housing so as to condition it for reception by the cleaner by carrying a lighter portion rearwards through the body outlet and including an outlet for delivering an air flow to engage crop material leaving the rear edge of the grain pan and falling towards the cleaning shoe.

20. The invention defined in claim 19 wherein the blower assembly includes a second outlet for delivering a flow of air over the grain pan from front to rear to engage crop material from the housing.

21. The invention defined in claim 20 wherein the blower assembly further includes deflector means associated with the second outlet for laterally differentiating the air flow over the grain pan into a central portion and a pair of opposite flanking portions.

22. In a combine having an axial flow rotary separator including a rotor and an at least partially foraminous housing surrounding the rotor and having foramina above and below the rotor, and opposite combine body walls spaced laterally from the opposite sides of the separator housing in which crop material is processed by the separator, a portion passing through the foramina of the housing, and some of that portion passing upwards and then outwards and downwards to pass between the body walls and the separator housing, resulting in a concentration of crop material adjacent the body walls and a cleaning shoe disposed to receive crop material passing downwards from the separator housing, the improvement comprising:
- blower means for directing a flow of air generally rearwards adjacent lower portions of the separator housing to engage crop material passing downwards, said flow of air being laterally differentiated in that it includes central and opposite flanking portions adjacent the body walls, each portion having a specific separating effect per unit of width of the separator and that the flanking portions have a greater specific separating effect than the central portion of the air flow so as to accommodate the relatively greater concentration of crop material adjacent the body walls.

23. The invention defined in claim 22 wherein the flow of air in the flanking portions is of greater vertical extent than the flow of air in the central portion.

24. In a combine having a separator including a rotor and a grate at least partially wrapping the rotor, including the underside of the rotor, and a cleaning shoe below the grate, the rotor cooperating mechanically with the grate to thresh and separate crop material and at least a part of the material passing through the grate and falling freely towards the shoe, the shoe including mechanical means for dividing clean grain from the material, a blower assembly for aerodynamically augmenting the mechanical separation and cleaning provided by the separator and cleaning shoe comprising:
  a plurality of spaced co-axial blower wheels;
  a blower housing for each blower wheel, each housing including an air inlet opening and first and second scroll portions each partially wrapping the blower wheel periphery and each having a cut-off edge extending generally parallel to the blower wheel axis, closely adjacent the blower wheel periphery and each scroll portion, in terms of blower wheel rotation smoothly diverging from the wheel periphery towards a duct end of the scroll portion, the duct ends of the first and second scroll portions being spaced radially outwards of the cut-off edges of the second and first scroll portions respectively so as to define respectively first and second air delivery outlets;
  a plurality of first ducts, each first duct communicating with a first outlet for conveying and directing air delivered through that outlet; and
  a second duct spanning the plurality of blower wheels and having a plurality of inlet openings, each inlet opening communicating with a housing second air delivery outlet for receiving air from the respective blower wheel so that the second duct conveys a plurality of side-by-side streams of air.

25. The invention defined in claim 24 wherein each first duct delivers air in a stream to pass adjacent to the grate so as to engage crop material passing generally downwards from the grate and the second duct delivers streams of air to engage crop material engaged by or about to be engaged by the cleaning shoe.

26. The invention defined in claim 25 wherein the plurality of first ducts includes an outer duct and an inner duct and air from said ducts passes alongside and beneath the grate respectively.

27. In a combine having a separator body including spaced apart and generally upright and fore-and-aft body walls, a separating and cleaning system for processing crop material received from a forward-mounted gathering and feeding system and contained substantially between the body walls comprising:
  an approximately horizontal and fore-and-aft extending separator rotor;
  a separator housing having a plurality of axially and circumferentially spaced foramina and surrounding the rotor so as to create an annular space between the rotor and housing, said space having a forward inlet for receiving crop material from the feeding system, the rotor and housing cooperating to thresh and separate crop material while conveying it spirally rearwards within the annular space, at least a portion of the crop material passing radially outwards through the foramina of the housing and downwards in the space between the opposite body walls, said foramina being disposed so that the flow of material is dispersed over a substantial portion of the axial extent of the housing;
  a cleaning shoe disposed below a rearward portion of the separator housing so as to intercept a portion of the crop material passing downwards between the body walls and including at least one reciprocating sieve element having a forward portion;
  a grain pan disposed beneath a forward portion of the separator housing for receiving some of the crop material passing downwards from the separator housing substantially laterally spanning the space between the body walls and extending fore-and-aft and having forward and rearward grain pan edges, said rearward edge being disposed above the forward portion of the cleaning shoe sieve element;
  means for conveying crop material rearwards over the grain pan so that it falls from the rearward edge towards the forward portion of the cleaning shoe sieve element; and
  a blower assembly disposed beneath the grain pan and forward of the cleaning shoe and including first duct means for directing air rearwardly above the grain pan to engage crop material passing from the separator housing to the grain pan and second duct means for directing air rearwards towards the underside of the cleaning shoe sieve element.

28. The invention defined in claim 27 wherein the first duct means includes outer and inner sections for directing air alongside and beneath the separator housing respectively.

29. The invention defined in claim 27 wherein the separator housing foramina include a grate portion extending over the full circumference of the housing.

30. The invention defined in claim 27 wherein the first duct means includes duct portions disposed beneath and closely adjacent and approximately parallel to the grain pan.

* * * * *